3,008,460
Patented Nov. 14, 1961

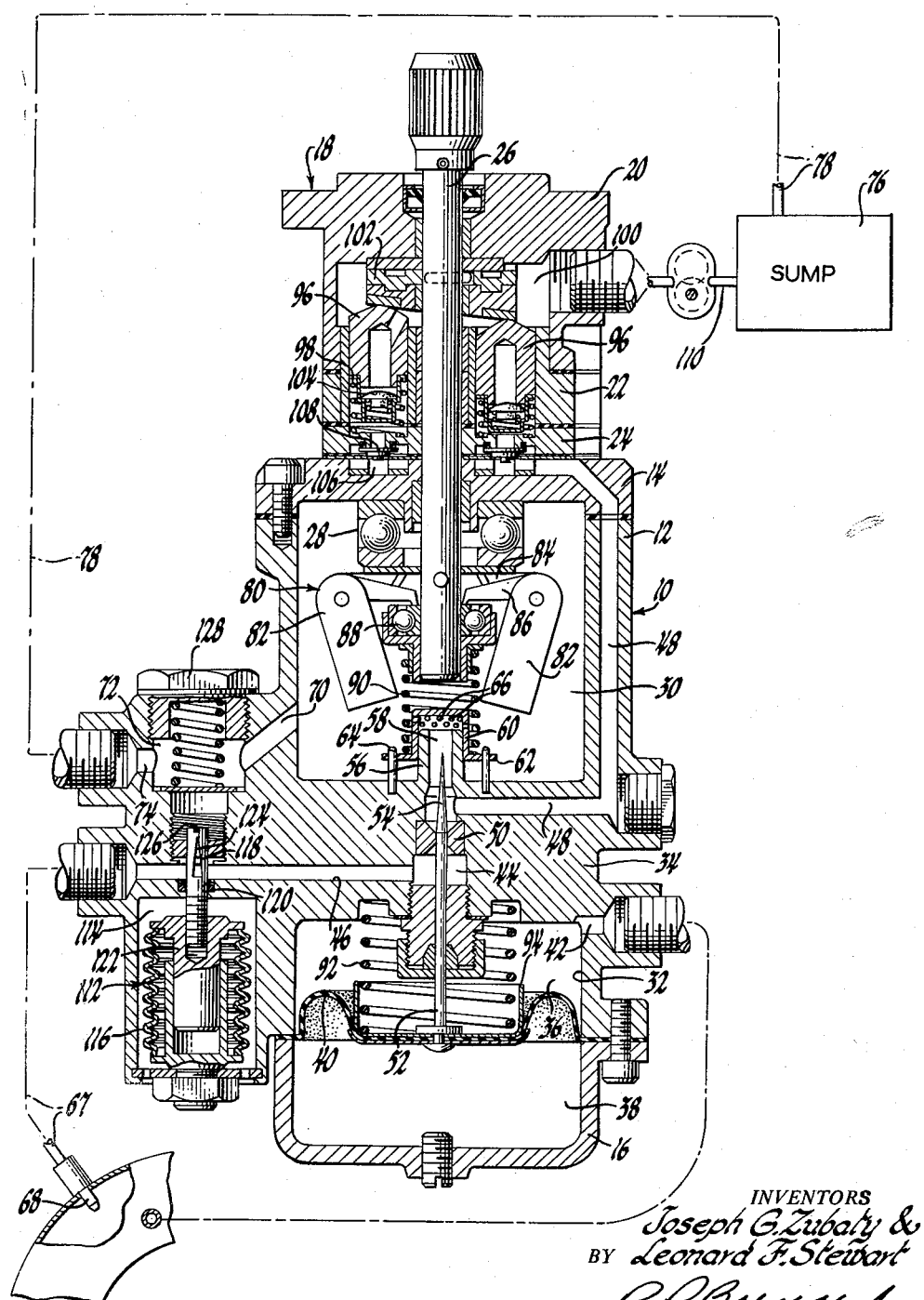

3,008,460
SPEED-DENSITY FUEL METERING DEVICE
Joseph G. Zubaty and Leonard F. Stewart, Flint, Mich., assignors to General Motors Corporation, Detroit, Mich., a corporation of Delaware
Filed Nov. 12, 1959, Ser. No. 852,405
6 Claims. (Cl. 123—119)

The present invention relates to a compact speed-density fuel metering device which is particularly adaptable for use with small type aircraft power plant installations.

In the present invention fuel is delivered under a pressure proportional to the speed of the engine to a fuel metering valve. Flow through the metering valve is primarily determined by engine load which is manifested by the degree of manifold vacuum applied to a diaphragm attached to the valve. The present fuel control device is of the continuous flow type in which fuel is supplied to the metering valve in excess of that quantity required by the engine. In such a system it is necessary to provide a bypass valve which returns the excess fuel back to the fuel reservoir or sump. In the present invention the bypass valve is uniquely controlled by an engine speed responsive governor device whereby the quantity of fuel bypass is generally inversely proportional to engine speed. Inasmuch as the present device is particularly adapted for aircraft use, an altitude and temperature responsive valve is provided between the fuel metering valve and the fuel nozzles whereby the quantity of fuel supplied to the nozzles is corrected for ambient operating conditions.

Other objects and advantages of the present invention will be apparent from a perusal of the detailed description which follows.

The drawing is a sectional view of the subject fuel metering device.

The speed density fuel metering device is indicated generally at 10 and includes a main body casing 12 generally enclosed by end cover casings 14 and 16. A fuel pressurizing pump 18 is secured to end casing 14 and in turn includes casings 20, 22, and 24 which are centrally apertured to permit an engine driven shaft 26 to extend therethrough. Shaft 26 is rotatably supported on a ball bearing member 28 mounted on the interior of casing 14.

Main casing 12 is generally divided into two sections 30 and 32 by casing wall 34. Section 32 is in turn divided into chambers 36 and 38 by a flexible diaphragm 40 peripherally clamped between main casing 12 and end casing 16. Chamber 36 communicates through a conduit 42 with a source of manifold vacuum.

A longitudinal passage 44 is formed through casing wall 34 and communicates at one end with a transversely extending fuel outlet passage 46 and further communicates with a fuel inlet passage 48. A fuel metering orifice 50 is disposed in an enlarged portion of passage 44 intermediate inlet and outlet passages 48 and 46. A fuel metering rod 52 is centrally secured to diaphragm 40 and includes a tapered end 54 adapted to extend through and cooperate with orifice 50 to regulate the quantity of fuel that may flow from inlet passage 48 to outlet passage 46.

Casing wall 34 is formed with a centrally projecting boss 56 through which passage 44 extends and terminates in an open end 58. A valve member 60 is slidably mounted on boss 56 and includes a flange 62 having openings therein adapted to coact with guide pins 64. Valve member 60 has a plurality of perforations 66 formed therein and through which fuel from passage 44 is adapted to flow to bypass chamber 30. The quantity of fuel flowing through perforations 66, and accordingly the quantity of fuel bypassed around metering rod 52, is determined by the axial position of valve 60 in relation to boss 56. As the valve member moves upwardly relative to the boss more perforations are opened to bypass more fuel. On the other hand, as the valve member moves downwardly on the boss less fuel will be bypassed and accordingly more fuel supplied through conduit 67 to nozzles 68. Fuel bypass chamber 30 communicates through a passage 70 with an outlet chamber 72 from which fuel is discharged through passage 74 and returned to fuel reservoir or sump 76 by a conduit 78.

The axial position of valve member 60 is controlled by a fly-weight governor mechanism indicated generally at 80. Governor 80 includes pivoted weights 82 mounted on a bracket 84 fixed to shaft 26. The weights include inner arms 86 which coact with a ball bearing device 88 slidably retained on shaft 26 and which device is interconnected with valve member 60 through a compression spring 90. The force exerted by spring 90 on valve 60 will be variable in accordance with the position of fly-weights 82. At low engine speeds, the force of spring 90 will be relatively light and fuel pressure in passage 44 will lift bypass valve 60 a predetermined amount until a balance is established between spring and fuel pressures thereby determining the quantity of fuel bypassed and in turn the quantity of fuel supplied to nozzles 68. With increased engine speed an increased closing force is exerted on spring 90 and valve 60 decreasing the quantity of fuel bypassed to chamber 30 and increasing the fuel supplied to nozzles 68.

As already noted, fuel metering valve or rod 52 is controlled by manifold vacuum actuated diaphragm 40. A spring member 92 is supported upon casing 12 and biases against diaphragm 40 through a reinforcing cup 94 centrally fixed thereto to urge the metering valve in a fuel flow increasing direction. Here again, a balanced condition is established between the force of spring 92 and the value of manifold vacuum in chamber 36 to regulate the quantity of fuel supplied to the fuel nozzles.

Fuel under pressure is supplied to passage 48 from fuel pump 18 which includes a plurality of pump pistons 96 symmetrically disposed about shaft 26 in casings 22 and 24. Pump pistons 96 are urged in an upwardly or charging direction by springs 98 under which condition fuel from inlet passage 100 is adapted to flow through the piston until such time as the angled driving plate 102 fixed to shaft 26 forces the piston downwardly at which time check valve 104 will close and fuel under pressure will be forced into a common outlet chamber 106 which communicates with fuel passage 48. Additional check valves 108 prevent the discharge from one pump piston from flowing back through another piston. Pump inlet passage 100 communicates through a supply conduit 110 with fuel reservoir 76.

In order to maintain a substantially constant fuel/air ratio output from device 10, an ambient temperature and pressure responsive valve mechanism 112 is provided in casing 12 to vary the quantity of fuel flow to nozzles 68. Casing 12 includes an atmospherically vented chamber 114 within which an aneroid or bellows member 116 is disposed. A valve member 118 is fixed to bellows 116 and extends through a passage 120 intersecting output passage 46 and communicating with chamber 72. Valve member 118 is threadedly disposed within a collar 122 secured to bellows 116 and includes a tapered slot 124 formed therein and generally aligned with outlet passage 46. The upper end of valve member 118 is slotted at 126 to receive a suitable tool for adjusting the position of slot 124 relative to passage 46. Access to valve member 118 is achieved through chamber 72 by removing cap 128.

In operation valve 118 will move to increase the quantity of fuel bypassed to chamber 72, and hence decrease the quantity of fuel supplied to fuel nozzles 68 with increases in either ambient temperature or altitude. It is apparent that this modification of the fuel supplied to the nozzles is desirable since less fuel is required in either case to combine with the less dense air flowing into the associated engine.

In summary, the quantity of fuel flowing from fuel outlet passage 46 is determined by the actuation of three valves, to wit, the manifold vacuum controlled metering valve 52, the engine speed controlled bypass valve 60, and the ambient pressure and temperature responsive valve 118.

What is claimed is:

1. A fuel metering system of the speed-density type comprising, a fuel source, an engine driven shaft, a fuel pump driven by said shaft, a nozzle, first conduit means for supplying fuel from the pump to the nozzle, a first valve connected in series with the conduit means, engine load responsive means for controlling the first valve, a second valve connected in parallel with the first valve, second conduit means connecting the second valve with the fuel source whereby fuel flow through the second valve is returned to said source, and means responsive to the speed of said shaft for controlling the operation of the second valve, and a third valve in said first conduit means for modifying fuel flow in accordance with ambient atmospheric operating conditions.

2. A fuel metering system of the speed-density type as set forth in claim 1 in which the third valve is disposed intermediate said first valve and said nozzle.

3. A fuel metering system of the speed-density type as set forth in claim 2 in which said third valve is adapted to by-pass fuel from said first conduit means to said second conduit means.

4. A fuel metering device for an internal combustion engine comprising a first casing member including a partition forming first and second chambers, a shaft rotatably supported in said casing, a governor device driven by said shaft and mounted in said first chamber, a fuel supply pump mounted on said casing and adapted to be driven by said shaft to provide fuel under pressure proportional to said shaft speed, a sump for supplying fuel to said pump, a fuel passage disposed in said partition, first conduit means adapted to supply fuel under pressure from said pump to said partition passage, second conduit means communicating said partition passage with a fuel outlet port, an orifice formed in said partition passage intermediate said first and second conduit means, a fuel metering valve adapted to coact with said orifice to control the quantity of fuel flow to said second conduit means, engine load responsive means disposed in said second casing chamber and operatively connected to the fuel metering valve and adapted to increase fuel flow through the valve as engine load increases, third conduit means communicating the first chamber with the sump, one end of said partition passage adapted to communicate with said first casing chamber, and valve means coacting with said partition passage to vary the fuel flow from said passage to said first chamber, said governor device being operatively connected to said latter valve whereby the flow of fuel therethrough is inversely proportional to the speed of said draft.

5. A fuel metering device for an internal combustion engine comprising a first casing member including a partition forming first and second chambers, a shaft rotatably supported in said casing, a governor device driven by said shaft and mounted in said first chamber, a fuel supply pump mounted on said casing and adapted to be driven by said shaft to provide fuel under pressure proportional to said shaft speed, a sump for supplying fuel to said pump, a fuel passage disposed in said partition and coaxial with said shaft axis, first conduit means adapted to supply fuel under pressure from said pump to said partition passage, second conduit means communicating said partition passage with a fuel outlet port, an orifice formed in said partition passage intermediate said first and second conduit means, a fuel metering valve adapted to coact with said orifice to control the quantity of fuel flow to said second conduit means, a diaphragm disposed in said second casing chamber and secured to the fuel metering valve, spring means urging said diaphragm and fuel metering valve in a fuel flow increasing direction, third conduit means communicating said second chamber with a source of engine manifold vacuum whereby said vacuum is adapted to act on said diaphragm to decrease the fuel flow through the metering valve against the force of the spring, fourth conduit means communicating the first chamber with the sump, one end of said partition passage adapted to communicate with said first casing chamber, valve means coacting with said partition passage to vary the fuel flow from said passage to said first chamber, said governor device being operatively connected to said latter valve whereby the flow of fuel therethrough is inversely proportional to the speed of said shaft, and valve means associated with said second conduit means for varying the fuel flow therethrough in accordance with ambient operating conditions.

6. A fuel metering device as set forth in claim 5 in which the ambient operating condition controlled valve means is adapted to by-pass fuel to the fourth conduit means.

References Cited in the file of this patent

UNITED STATES PATENTS

| | | |
|---|---|---|
| 2,871,844 | Elliott et al. | Feb. 3, 1959 |
| 2,918,914 | Ball | Dec. 29, 1959 |